US008558799B2

(12) United States Patent
Destura et al.

(10) Patent No.: US 8,558,799 B2
(45) Date of Patent: Oct. 15, 2013

(54) METHOD AND DEVICE FOR USER INTERACTION

(75) Inventors: Galileo June Destura, Eindhoven (NL); Armanda Cinderella Nieuwkerk, Grashoek (NL); Johan Thomas Oostveen, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 1230 days.

(21) Appl. No.: 12/158,046

(22) PCT Filed: Dec. 18, 2006

(86) PCT No.: PCT/IB2006/054913
§ 371 (c)(1),
(2), (4) Date: Jun. 19, 2008

(87) PCT Pub. No.: WO2007/072392
PCT Pub. Date: Jun. 28, 2007

(65) Prior Publication Data
US 2008/0303802 A1 Dec. 11, 2008

(30) Foreign Application Priority Data
Dec. 22, 2005 (EP) .................................. 05112780

(51) Int. Cl.
*G09G 5/00* (2006.01)
(52) U.S. Cl.
USPC ............. 345/173; 345/104; 345/89; 349/115; 349/168; 349/169; 349/175; 349/176; 349/185; 252/299.5; 252/583

(58) Field of Classification Search
USPC ................... 345/4, 5, 6, 87, 204, 88, 90, 173; 349/88–89, 115, 168, 169, 175, 176, 349/185; 348/207, 274; 428/1.1, 1.2; 252/299.5, 299.7, 583, 586, 588
See application file for complete search history.

(56) References Cited

U.S. PATENT DOCUMENTS

| 5,510,813 A | 4/1996 | Makinwa et al. |
| 5,736,973 A * | 4/1998 | Godfrey et al. ............... 345/102 |
| 6,333,753 B1 | 12/2001 | Hinckley |
| 6,501,529 B1 | 12/2002 | Kurihara et al. |

(Continued)

FOREIGN PATENT DOCUMENTS

| DE | 20311135 U1 | 10/2003 |
| DE | 10332953 A1 | 2/2005 |

(Continued)

OTHER PUBLICATIONS

Hinckley et al: "Touch-Sensing Input Devices"; Microsoft Research, CHI 99, May 15-20, 1999, pp. 223-230.

*Primary Examiner* — Lun-Yi Lao
*Assistant Examiner* — Priyank Shah

(57) ABSTRACT

The invention relates to a user interaction device (200, 300) comprising an optical module (210, 310) having a layer (5) of a substance being electrically switchable between a first visual state and a second visual state, and an electrical switch (6a, 6b) for electrically switching the substance between the first and second visual states, a detector (6a, 11b) for detecting the presence of a physical object, and a control unit (290, 390) for controlling the electrical switch in response to the detection of presence of the physical object.

16 Claims, 2 Drawing Sheets

(56) References Cited

U.S. PATENT DOCUMENTS

| | | | |
|---|---|---|---|
| 8,031,273 B2* | 10/2011 | Yabuta et al. | 349/12 |
| 8,063,887 B2* | 11/2011 | Barrus et al. | 345/173 |
| 2003/0193599 A1* | 10/2003 | Campbell et al. | 348/333.01 |
| 2004/0179001 A1* | 9/2004 | Morrison et al. | 345/179 |
| 2004/0189612 A1* | 9/2004 | Bottari et al. | 345/173 |
| 2005/0088417 A1 | 4/2005 | Mulligan | |
| 2005/0174335 A1* | 8/2005 | Kent et al. | 345/173 |
| 2005/0243069 A1* | 11/2005 | Yorio et al. | 345/173 |
| 2007/0085838 A1* | 4/2007 | Ricks et al. | 345/173 |
| 2008/0252822 A1* | 10/2008 | De Koning et al. | 349/88 |

FOREIGN PATENT DOCUMENTS

| | | |
|---|---|---|
| EP | 1241558 A2 | 9/2002 |
| WO | WO03012618 A2 | 2/2003 |
| WO | WO2004013746 A2 | 2/2004 |
| WO | WO2007039861 A1 | 4/2007 |
| WO | WO2007039863 A1 | 4/2007 |

* cited by examiner

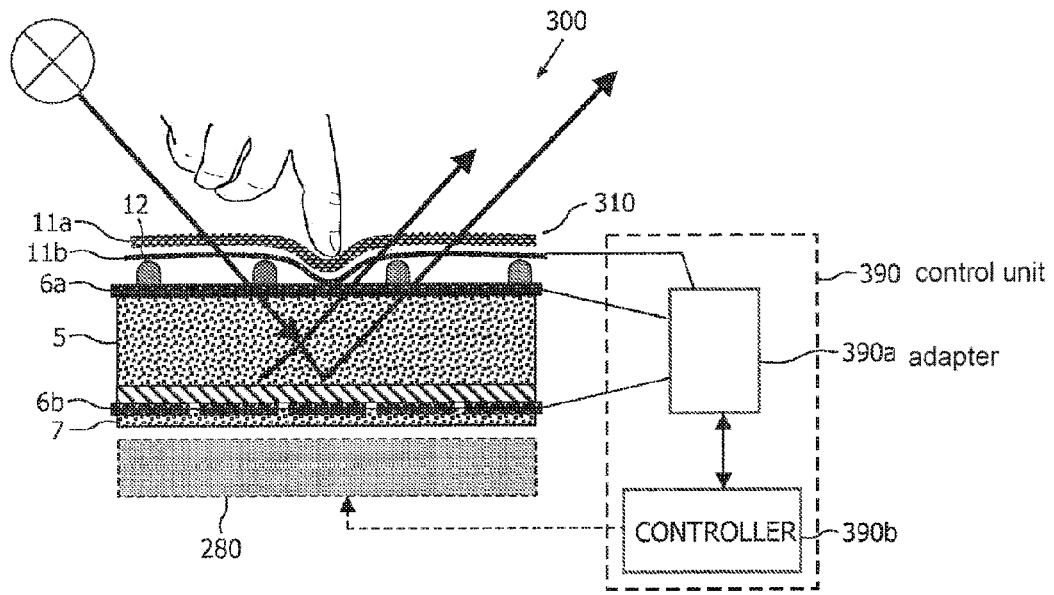

FIG. 3

Using an optical module having a layer of a substance being electrically switchable between a first visual state and a second visual state, and an electrical switch for electrically switching the substance between the first and second visual states —410 detecting the presence of a physical object —420 controlling the electrical switch in response to the detection of the presence of a physical object —430

FIG. 4

METHOD AND DEVICE FOR USER INTERACTION

The invention relates to a user interaction device, a system comprising the user interaction device, and a user interaction method.

WO03012618 discloses a touch screen display comprising a sensor for detecting a presence of a user's finger or of a stylus in a vicinity of a portion of the display. The touch screen display is coated with a resistive layer. Alternatively, the touch screen display is constructed on the basis of the surface wave technology or the capacitive technology. The touch screen display may display a graphical window. When the sensor detects the presence of a user's finger in the vicinity of the display, a graphical menu is temporarily displayed, and the graphical window, wherein the content is viewed, is automatically reduced in size or overlapped by the graphical menu. The graphical menu is hidden again after a predetermined period of time. In order to have the graphical menu displayed again, the user has to move his hand away from the touch screen display and to approach it again.

The sensor known from WO03012618 passes the signals to a central processing unit (CPU) for controlling the display. The sensor itself does not have any means for communicating to the user. For the communication to the user, the display is required. At the same time, the combination of the display and the sensor is a complex and expensive system.

It is desirable to provide a user interaction device capable of detecting the user interacting with the device and of providing a feedback to the user without the need to couple the user interaction device with an expensive display.

The user interaction device of the present invention comprises an optical module having a layer of a substance being electrically switchable between a first visual state and a second visual state, and an electrical switch for electrically switching the substance between the first and second visual states, a detector for detecting the presence of a physical object, and a control unit for controlling the electrical switch in response to the detection of the presence of the physical object.

The detector is in general adapted for detecting an event of the user input via the presence of the physical object. Depending on the kind of detector, different types of user input are detected. For example, the user input is a touch of the user to the device, a particular proximity, e.g. a predetermined distance, of the user to the device, a specific location on the device touched by the user. The physical object may be the user's finger, a stylus, etc.

The optical module allows for a visual feedback to the user in response to the detection of the presence of the physical object. The optical module according to the invention comprises the layer of the substance that changes its visual state upon an application of an electrical field, e.g. a certain voltage difference to the substance via the electrical switch. For example, the electrical switch comprises two transparent electrodes (e.g. indium-tin-oxide, ITO, or indium-zinc-oxide, IZO), on opposite sides of the layer, for the application of the voltage difference to the substance. Such an optical module is much cheaper than for example known LCD and CRT displays.

The layer may be of a scattering substance based on, for example, PDLC (Polymer Dispersed Liquid Crystals), polymer network Liquid Crystal or Liquid Crystal gels. The substance may change its visual state from a transparent state to a scattering state or vice versa, i.e. from the scattering to the transparent state. The term "scattering" means that light is directed in random directions. A portion of ambient light directed on the scattering layer is partially reflected due to the diffuse reflection. The ambient light may be a lamp or the sun light in the room in which the device is located. The scattering layer allows the hiding of an object behind the scattering layer. Our European patent application no. 05109148 entitled "An image display apparatus" discloses that the optical module may be used for hiding a display screen e.g. a TV screen. In addition to the scattering layer and the electrical switch, the optical module also comprises a reflective layer, e.g. in between the display screen and the scattering layer, to improve the reflection of the ambient light. Our European patent application no. 05109149 discloses an optical module (electro-optical switch) that may also be used in the present invention. A reflective layer is added in the optical module to increase the multiplex ratio of addressing strips of the scattering layer.

In one of the visual states, the voltage difference between the electrodes may be minimal to avoid unnecessary energy consumption. Preferably, the optical module is designed so that the visual state of the substance to which the minimal voltage is applied corresponds to transparent or opaque as desired for a situation when the optical module is not actively used. The other visual state of the substance when a higher voltage difference is applied is triggered when the optical module is actively used, e.g., when the user interaction with the device is detected.

According to the invention, the user input to the device is detected via the presence of the physical object. To create the user interaction interface, the device is adapted to react to the input of the user. The feedback of the device to the user comprises the change of the visual state of the substance, e.g. optically scattering substance. For this purpose, the device comprises the control unit for triggering the change of the visual state of the substance via the electrical switch in response to the detection of the physical object presence. Therefore, the detector and the optical module are combined to create an active user interaction interface without the need for any extra display device.

Advantageously, the detector and the electrical switch may be integrated for detecting the user input so that the complexity and cost of the device is reduced. Such integration may be achieved e.g. by using one of the electrodes of the electrical switch as a resistive sensor for sensing a touch of the user to the electrode. The electrodes of the electrical switch may be operated in a touch sensitive mode when the voltage difference on the electrodes is below a level at which the substance changes its visual state, and in a visual switching mode when the voltage difference is above the level. For example, the electrical switch may be first operated in the touch sensitive mode. Upon the detection of the touch, the electrical switch may be operated in the visual switching mode.

A system of the present invention comprises the user interaction device and a display device e.g. a LCD or CRT display.

A user interaction method of the present invention comprises the steps of using an optical module having a layer of a substance being electrically switchable between a first visual state and a second visual state, and an electrical switch for electrically switching the substance between the first and second visual states, detecting the presence of a physical object, and controlling the electrical switch in response to the detection of the presence of the physical object.

The method describes the operation of the device of the invention.

These and other aspects of the invention will be further explained and described, by way of example, with reference to the following drawings:

FIG. 3 is a functional block diagram of an embodiment of the device according to the present invention, where one of electrodes of the electrical switch may be used for detecting a location of the user's touch;

FIG. 4 is an embodiment of the method of the present invention.

For purposes of brevity and clarity, identical or corresponding components and elements of the device of the invention will bear the same designations or numbering throughout the figures.

There are many known methods of detecting a touch or proximity of the user's finger or a stylus to a (touch) sensitive surface. Among the known methods, the major sensing technologies are resistive, capacitive and surface acoustic wave. These major technologies provide for an assembly comprising a sensing panel and a controller. A touch frame is typically mounted over a display.

Figure 1:
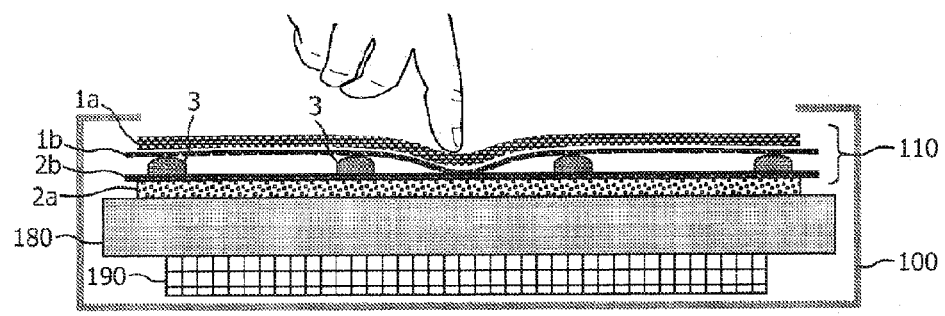
FIG. 1 is a functional block diagram of the touch screen according to the resistive sensing technology.

FIG. 1 shows an example of a touch screen panel assembly according to the resistive technology. The assembly in a housing 100 comprises a touch panel 110, an LCD display 180 and a controller 190.

The touch panel comprises a flexible layer having an abrasion and chemical resistant film 1a and a first transparent conductive coating 1b, and a support layer having a substrate 2a and a second transparent conductive coating 2b. The film 1a may be made of a flexible material such as a clear plastic film, e.g. an optical-grade polyester film. The substrate 2a may be of a clear material, e.g. glass and/or polyethylene terephthalate, polycarbonate. The coating 1b or 2b may be a thin layer of (semi-) transparent metal, e.g. sputtered indium-tin-oxide (ITO). The flexible layer and the support layer are separated by insulating elastic spacers, e.g. transparent spacer dots or beads 3. Adhesive may be additionally applied on the edges between the flexible and support layers. The layers may also be separated by a gasket.

In operation, a linear voltage drop from one edge to the other opposing edge may be applied to either one of the coatings 1b or 2b. The other opposing electrode is used as a voltage probe to the electrode wherein the voltage drop is applied. When the flexible layer is depressed by the touch, the coatings 1b and 2b contact each other to form an electrical circuit, and the voltage is sensed, through the electrode that acts as the voltage probe, at the touched location and transmitted to the controller 190 for processing.

In addition, the controller 190 may comprise an analogue-to-digital converter and some logic circuitry for converting the voltage into X- and Y-touch location. The measured voltage through the voltage probe is directly proportional to the touched location coordinate. To determine X- and Y-coordinates of the touch, the voltage may be alternatively applied to the coatings 1b and 2b. For example, first the voltage measured on one of the coatings is translated into the X-coordinate. The linear voltage drop is then applied to the other coating, in the orthogonal direction with respect to the previous voltage drop direction, to obtain the Y-coordinate. The resistive technology has the advantage that it works with any stylus, including gloved hands.

The coating 1b or 2b may have parallel conductive strips orthogonal to conductive strips of the other coating. The conductive strips may be from e.g. ITO material or conductive ink.

The capacitive sensing technology may be implemented with a touch panel, e.g. from glass, coated with conductive material, e.g. ITO, connected to an electrical energy source. When a user touches the touch panel, the body capacitance of the user may cause a change in characteristics of the capacitance field. Electronic circuits, e.g. located in the corners of the touch panel, measure the distortion. X- and Y-coordinates of the touch may be calculated from the measured distortion. The capacitive touch technology works well to sense the touch by the bare finger but not of a pen or gloved finger. However, the pen is sensed if it is provided with for example a resonant coil. If the touch panel is used with a display, the capacitance sensing coating may be provided behind the display to improve the visibility of the display.

The surface acoustic wave technology uses inaudible, e.g. ultrasonic waves that propagates along the touch panel's surface from one edge to the other opposite edge. The waves are distributively propagated along the touch panel's surface. Due to the resulting different path lengths, the waves arrive time sequentially on the sensor side. The touch coordinate is then proportional to the time delay, i.e. the delay from launching the wave to receiving it on the sensor side. When the surface is touched, the wave propagating through the touch location has its energy partly attenuated. This attenuation is then detected and the corresponding time delay is noted and translated into touch coordinate location.

According to the present invention, a detector for detecting a presence of a physical object is used in the user interaction device. The detector may be adapted to sense the touch or proximity of the user or an object like a pen on the basis of the principles of the resistive technology, the capacitive technology or the surface acoustic wave technology as explained above.

To generate a feedback to the user, the user interaction device of the present invention further comprises an optical unit for providing a visual response, and a control unit for triggering the visual response in response to the detection of the user's input.

Figure 2:
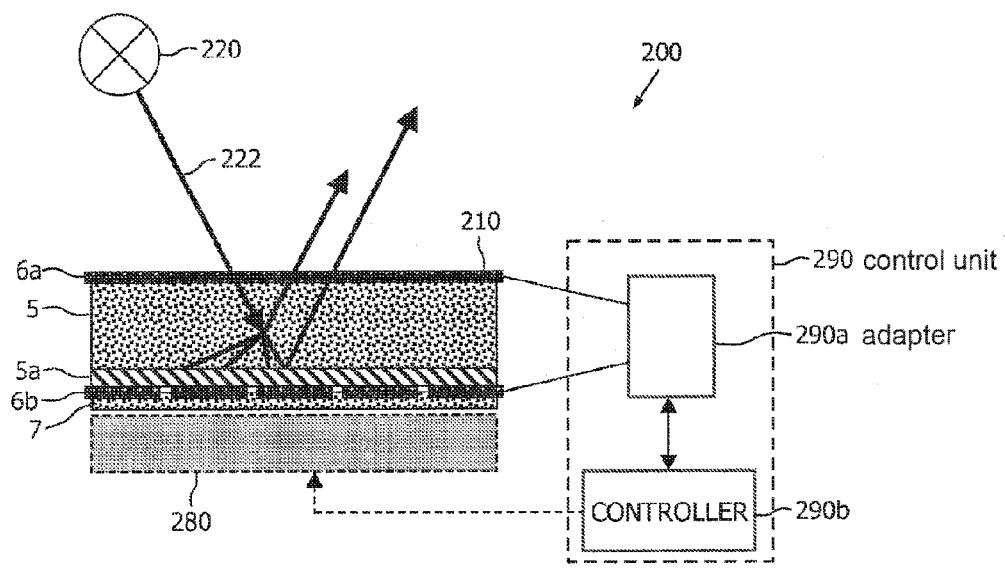
FIG. 2 is a functional block diagram of an embodiment of the device according to the present invention, where one of electrodes of the electrical switch is used for detecting a user's touch.

FIG. 2 shows an embodiment of the present invention. In this embodiment, the device 200 comprises the optical unit 210, the control unit 290, and an optional display 280. The optical unit 210 may comprise a layer 5 of a substance, e.g. a polarizer, suitable for being switched in respect of its visual state by applying an electrical field; and an electrical switch, e.g. electrodes 6a and 6b, for electrically switching the substance between its first and second visual states. The optical unit 210 may be provided with a substrate 7 made from e.g. an insulating material, for example glass or plastics.

An example of the layer 5 of the electrically switchable substance is a scattering layer arranged to randomly re-direct, and optionally reflect, at least a portion of ambient light 222, e.g. daylight, from an ambient light source 220. Substances of different types may be used to form the layer 5. For example, a substance having a transparent state and an opaque state may be used, which is especially useful in combination with the display 280 in view of the hiding effect. If the substance has the transparent state, it is advantageous that the electrodes 6a and 6b are made of transparent conducting material, e.g. ITO or IZO. The substance in the layer 5 can be based e.g. on Cholesteric liquid crystals switchable between a diffusive reflective, specular reflective, scattering and transparent states depending on certain conditions and the applied electrical field. It is also possible to use the layer 5 with a substance electrically switchable between two visually different opaque states, or between multiple greyscale visual states.

The layer 5 may also be provided with a reflective layer 5a for reflecting the ambient light, e.g. back to the scattering layer. The reflective layer 5a may be based on a polarizer, e.g. a scattering polarizer having different behaviour for respective polarization directions, or a reflective polarizer, as disclosed in detail in our European patent application no. 05109148 entitled "An image display apparatus". The reflective layer 5a may also be arranged outside of the layer 5, e.g. between the substrate 7 and the display 280.

The device 200 comprises the detector for detecting the presence of the physical object according to the resistive technology, e.g. realized with a simple electrically conductive element. When the user touches the element, the control unit could register for example a change in impedance of the element. The change of the impedance may signal that the user interacts with the device. The electrically conductive element may be provided separately from the optical module 210. However, when the electrically conductive element is combined with the optical module, simpler and more effective construction of the device is achieved. For example, the electrode 6a of the electrical switch is adapted to function as the detector.

In the embodiment of FIG. 2, the electrodes 6a and 6b are coupled to an adapter 290a of the control unit 290. The adapter 290a is adapted to apply required voltage to the electrodes. In a touch sensitive mode, the voltage difference between the electrodes 6a and 6b may be insufficient to switch between visual states of the optical module 210, but enough to detect the impedance change in the electrode 6a. The change of the resistance is registered by a controller 290b of the control unit 290. In response, the controller 290b may trigger the adapter to change the voltage difference between the electrodes 6a and 6b so that the substance of the layer 5 switches from one visual state to the other visual state.

The controller 290b may be realised as a data processing unit suitably arranged to implement the present invention and enable the operation of the device as explained herein. The adapter 290a may comprise an electrical power supply means and electrical circuits for supplying the required voltage to the layer 5.

The electrode 6b of the electrical switch may comprise one or more patterns of driving electrodes for switching respective portions of the layer 5 between the visual states, e.g. by means of passive matrix addressing of the corresponding electrodes, as disclosed in our European patent application no. 05109149. The patterns may also be positioned in separate electrode layers for creating a multi-functional display.

Advantageously, the reflective layer 5a may comprise an electrically conductive material. The reflective layer may be adapted for detecting the physical object proximity according to the capacitive sensing technology.

FIG. 3 shows a device 300 that is different from the device 200 shown in FIG. 2 primarily in respect of the means for the detection of the physical object presence. The device 300 additionally comprises a flexible layer having a film 11a and a conductive coating 11b. The film 1a may be made of a flexible and, optionally, transparent material, e.g. an optical-grade polyester film. The conductive coating may also be transparent, e.g. from the sputtered ITO material. The flexible layer and the electrode 6a are separated by insulating elastic spacers 12, e.g. transparent spacer dots or beads.

It should be noted that the arrangement of the elements in FIG. 3 may be different than it is shown. For example, the film 11a can be a hard substrate, whereas the electrodes 6a and 6b and the layer 5 of the substance are flexible. To keep the substance in place in the layer 5, another support layer (not shown) may be provided between the electrode 6a and the layer 5, while the substance remains electrically switchable.

In the touch sensitive mode, an adapter 390a of a control unit 390 is configured to supply a voltage to the coating 11b. When the user touches the flexible layer with the finger or the stylus, the coating 11b contacts the electrode 6a, and an electrical circuit is created. The electrical contact triggers the adapter to communicate a signal to a controller 390b of the control unit 390. The control unit may be configured to control the adapter to apply a voltage to the electrodes 6a and 6b to switch the layer 5 of the substance from one visual state to the other one. Depending on the specific implementation, the voltage level applied to the coating 11b and the electrode 6a is selected.

The detector may be configured to detect a location of the touch, e.g. by measuring the resistance of the coating 11b and/or of the electrode 6a. For example, the controller 390b may be configured to measure the impedance first between the point of contact and one of the edges of the coating 11b using the electrode 6a as a probe to determine one coordinate, e.g. the X-coordinate. Then the impedance is measured again between the point of contact and one of the sides, with the side chosen orthogonal to the side chosen when the other coordinate was determined, of the electrode 6a, using electrode 11b as the probe. For example, if the total resistance R of the electrode 6a is (A*R+(1−A)*R), where 0<A<1, and the parameter A depends on the touch location, it is possible to determine the touch location using the measurements.

In an advanced embodiment, the controller 390b is configured to control the adapter 390a for driving the pattern of electrodes as an optical display responsively to the determined location. For example, when the device 300 has the form of a volume control strip and the user touches the strip in the middle, half of the strip is shown so that the user knows that the volume is set correspondingly.

The display 280 is optional. The device 300 may be mounted also on any surface other than the display screen. For example, the device 300 may be embedded in a window which glass or plastic may function as the substrate 7. Such a window would be advantageous in a car where the driver would be able to touch the front window for the control, a public terminal such as the ATM where no massive separate display would be required, etc.

The substance of the layer 5 may be selected so that one of its visual states matches or depends on an ambiance colour. For example, the substance may switch between a transparent state and grey colour when the device is overlaid over a TV display 280 having a grey housing. When the TV is switched off, the device has the grey colour, and when the user watches the TV, the layer 5 is transparent.

In one embodiment of the present invention, the device is adapted for measuring a pressure of the physical object. For example, a pressure of the finger or the stylus on the electrode 6a of the device 200 is measured. The detector adapted for measuring the pressure may be implemented as known from U.S. Pat. No. 5,510,813. In the known method of measuring the pressure of the touch, a support means of the device is adapted for causing a narrowing between conductive panels in response to the applied touch pressure. The narrowed distance between the panels results in a change in electrical capacitance. The pressure is determined from the measured capacitance.

FIG. 4 shows an embodiment of the method of the present invention. The method comprises a step 410 of using the optical module with the layer 5 and the electrical switch, as a user feedback means. In step 420, the presence of a physical object is detected by means of the detector as explained with reference to FIGS. 2 and 3. In step 430, the electrical switch is controlled in response to the detected user interaction so that the visual feedback is given to the user. Further embodiment of the method may be derived as explained with respect to the device shown in FIGS. 2 and 3.

Variations and modifications of the described embodiments are possible within the scope of the inventive concept. For example, the system according to the present invention may be implemented separately in a single device without the display screen 180 or 280.

The device may be integrated into various consumer electronics devices such as a television set (TV set), a VCR, DVD- or HDD-recorder, a home cinema system, a portable CD player, a remote control device such as an iPronto remote control, a cell phone, etc.

The invention claimed is:

1. A user interaction device comprising:
    an optical module having a layer of a substance being electrically switchable between a first visual state and a second visual state, and an electrical switch for electrically switching the substance between the first visual state and the second visual state;
    a detector for detection of presence of a physical object; and
    a control unit for controlling the electrical switch in response to the detection of the presence of the physical object to switch the substance from a non-transparent state to a transparent state,
    wherein the electrical switch and the detector are integrated for the detection of the presence of the physical object,
    wherein the electrical switch comprises two electrodes on opposite sides of the layer of the substance, one of the electrodes being used for the detection of the presence of the physical object, and
    wherein the control unit is configured to reduce a voltage across the substance for operating the user interaction device in a touch sensitive mode for the detection of the presence of a physical object, and to increase the voltage for operating the user interaction device in a visual switching mode for switching the substance between the first visual state and the second visual state.
2. The device as claimed in claim 1, wherein the layer comprises a scattering layer for scattering a portion of an ambient light.
3. The device as claimed in claim 2, wherein the scattering layer comprises a liquid crystal-polymer composite.
4. The device as claimed in claim 2, further comprising a reflective layer for reflecting a portion of the scattered ambient light back towards the scattering layer.
5. The device as claimed in claim 1, wherein the detector measures a pressure.
6. The device as claimed in claim 1, wherein the detector detects a touch location.
7. The device as claimed in claim 1, wherein either the first visual state or the second visual state of the substance corresponds to a selected color.
8. The device as claimed in claim 1, wherein the detector comprises a transparent conducting material.
9. The device as claimed in claim 1, wherein the electrical switch comprises a plurality of electrodes for selectively switching a portion of the layer of the substance between the first visual state and the second visual state.
10. A system comprising the user interaction device as claimed in claim 1, and a display device.
11. The system as claimed in claim 10, wherein the user interaction device is laid over the display device for displaying through the user interaction device.
12. The device of claim 1, wherein the reduced voltage between electrodes of the electrical switch is insufficient to switch the substance between the first visual state and the second visual state, but enough to detect the presence of the physical object.
13. The device of claim 12, wherein the detection of the presence of the physical object is based on an impedance change in one of the electrodes of the electrical switch.
14. A user interaction method comprising the acts of:
    using an optical module having a layer of a substance being electrically switchable between a non-transparent and a transparent state, and an electrical switch for electrically switching the substance between the first visual state and the second visual state;
    detecting a presence of a physical object; and
    controlling the electrical switch in response to the detection of the presence of a physical object to switch the substance from a non-transparent state to a transparent state,
    wherein the electrical switch and the detector are integrated for the detection of the presence of the physical object,
    wherein the electrical switch comprises two electrodes on opposite sides of the layer of the substance, one of the electrodes being used for the detection of the presence of the physical object, and
    wherein the controlling act comprises the acts of:
    reducing a voltage across the substance for operating the optical module in a touch sensitive mode for detection of the presence of a physical object; and
    increasing the voltage for operating the optical module in a visual switching mode for switching the substance between the first visual state and the second visual state.
15. The user interaction method of claim 14, wherein the reduced voltage between electrodes of the electrical switch is insufficient to switch the substance between the first visual state and the second visual state, but enough to detect the presence of the physical object.
16. The user interaction method of claim 15, wherein the detecting act is based on an impedance change in one of the electrodes of the electrical switch.

* * * * *